United States Patent
Nguyen et al.

(10) Patent No.: US 6,968,697 B2
(45) Date of Patent: Nov. 29, 2005

(54) INTEGRAL COMPRESSOR HOUSING OF GAS TURBINE ENGINES

(75) Inventors: Ly D. Nguyen, Phoenix, AZ (US);
Cristopher Frost, Scottsdale, AZ (US);
Ronald P. Maty, Chandler, AZ (US);
John M. Wait, Phoenix, AZ (US);
Jason C. Smoke, Phoenix, AZ (US);
Lori M. Wheeler, Scottsdale, AZ (US);
Richard D. Kocher, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 234 days.

(21) Appl. No.: 10/666,611

(22) Filed: Sep. 17, 2003

(65) Prior Publication Data

US 2005/0056019 A1 Mar. 17, 2005

(51) Int. Cl.[7] .............................. F02C 7/04; F02C 6/08; F02C 7/26
(52) U.S. Cl. ............................. 60/772; 60/782; 60/785; 60/787
(58) Field of Search .......................... 60/772, 782, 785, 60/787

(56) References Cited

U.S. PATENT DOCUMENTS

| | | | |
|---|---|---|---|
| 3,738,105 A | 6/1973 | Buchelt | |
| 3,841,790 A | * 10/1974 | Stein et al. | 415/159 |
| 3,853,432 A | * 12/1974 | Cronstedt | 60/39.08 |
| 4,030,288 A | 6/1977 | Davis et al. | |
| 4,075,562 A | * 2/1978 | Karstensen et al. | 60/796 |
| 4,418,528 A | 12/1983 | Pellow | |
| 4,474,000 A | * 10/1984 | Benson et al. | 60/39.511 |
| 4,590,759 A | * 5/1986 | Blizzard | 60/773 |
| 4,641,495 A | * 2/1987 | Mowill | 60/791 |
| 4,809,497 A | * 3/1989 | Schuh | 60/39.27 |
| 4,981,018 A | * 1/1991 | Jones et al. | 60/726 |
| 5,150,568 A | * 9/1992 | White | 60/797 |
| 5,220,784 A | 6/1993 | Wilcox | |
| 5,267,397 A | 12/1993 | Wilcox | |
| 5,274,992 A | * 1/1994 | Klaass et al. | 60/804 |
| 6,101,806 A | * 8/2000 | Chen et al. | 60/785 |

* cited by examiner

Primary Examiner—Ted Kim
(74) Attorney, Agent, or Firm—Robert Desmond, Esq.

(57) ABSTRACT

A turbine engine compressor design utilizing multiple component integration, thereby reducing the number of required engine components. In conventional compressor designs, a multiple component system makes it difficult to predict the structural behaviors due to thermal and mechanical loading during transient conditions. The compressor design of the present invention has three main parts: a forward bearing housing, a bell-mouth (heat shield) and a coupled impeller shroud/diffuser. Such a design achieves the design objectives of the present invention, including reducing weight, reducing cost, minimizing tolerance build up and improving aerodynamic performance by utilizing multiple component integration for multiple modes of engine operation.

27 Claims, 4 Drawing Sheets

INTEGRAL COMPRESSOR HOUSING OF GAS TURBINE ENGINES

This invention was made with Government support under contract number N00019-01-C-3002 with outside funding from Lockheed Martin—U.S. government under the Joint Strike Fighter (JSF) program. The Government has certain rights in this invention

BACKGROUND OF THE INVENTION

The present invention generally relates an engine compressor and, more specifically, to a turbine engine compressor utilizing multiple component integration, thereby reducing the number of required engine components.

Referring to FIG. 1, there is shown a conventional small gas turbine engine 100. Intake air is taken into engine 100 as shown by arrows 102. The intake air passes through a compressor wheel 104. As air passes through the compressor section 106, it is accelerated outwards at high speeds. The accelerated air is slowed down in a diffuser 108, which comprises a ring of static vanes. A portion of the accelerated air may be used in a combustion chamber 110, and a portion of the accelerated air may be used to drive other cold turbines or to pressurize aircraft cabins. Engine 100 is powered by burning fuel in combustion chamber 110, heating the air flowing into engine 100, causing it to expand and gain kinetic energy. The hot gases generated by the combustion process drive one or more turbine wheels 112 to create mechanical power that may be used, for example, to drive compressor wheel 104.

Conventional compressor design includes multiple components, including an inner housing 114 to hold bearing requirements, an outer housing 116 to carry the carcass load, an inlet plenum 118, a separate bell mouth 120, a diffuser 108 and compressor wheel 104. A multiple component system makes it difficult to predict the structural behaviors due to thermal and mechanical loading during transient conditions. Holding tighter clearances between components becomes impossible due to the manufacturing tolerance build up among the various components. Such a multiple component approach will not meet the light weight requirements of high-performance aircraft engines, such as typical fighter jet engines.

The power and thermal management system (PTMS) of high-performance aircraft has technical challenges that require a novel approach in the design of the compressor module. The turbine engines of these high-performance aircraft operate as a typical auxiliary power unit (APU) on the ground in an open-loop, fired mode and transitions to a closed-loop mode using main propulsion engine bleed air for power. These two modes of operation both require optimal clearance control between the rotating group and the static structure of the engine.

As can be seen, there is a need for a new design concept for a compressor housing of a gas turbine engine that minimizes weight, cost and tolerance build up by utilizing multiple component integration to maintain the optimum engine performance under both the open-loop, fired mode and the closed-loop mode of operation.

SUMMARY OF THE INVENTION

In one aspect of the present invention, a compressor module for a turbine engine comprises an external housing having a forward end and an aft end; having multiple inlets such as an open mode inlet duct and a closed mode inlet duct in the external housing; a forward bearing housing conically extending from the forward end of the external housing and into the external housing; and a bell mouth circumferentially disposed within the external housing.

In another aspect of the present invention, a compressor for a gas engine comprises an external housing having a forward end and an aft end, an open mode inlet duct and a closed mode inlet duct in the external housing, a forward bearing housing conically extending from the forward end of the external housing and into the external housing, a bell mouth circumferentially disposed within the external housing, a forward flange on the forward end, and an aft flange on the aft end; a compressor wheel rotatably disposed at the aft end on a shaft; and a compressor shroud/diffuser disposed circumferentially about the compressor wheel; wherein the bell mouth and the compressor wheel provide an air path for air to flow to the rotatable compressor wheel and to be discharged into a compressor discharge scroll at an increased pressure from a pressure at the inlet duct.

In yet another aspect of the present invention, a compressor for a gas turbine engine of an aircraft comprises an external housing having a forward end and an aft end, an open mode inlet duct and a closed mode inlet duct in the external housing, a forward bearing housing conically extending from the forward end of the external housing and into the external housing, a bell mouth circumferentially disposed within the external housing, a forward flange on the forward end, and an aft flange on the aft end; a compressor wheel rotatably disposed at the aft end on a shaft; a compressor shroud/diffuser disposed circumferentially about the compressor wheel, wherein the bell mouth and the compressor wheel provide an air path for air to flow to the rotatable compressor wheel and to be discharged into a compressor discharge scroll at an increased pressure from a pressure at the inlet duct; a hole in an apex portion of the conically extending forward bearing housing, wherein the shaft extends from the compressor wheel through the hole; a forward bearing disposed within the forward bearing housing, the forward bearing providing axial and radial support of the shaft extending through the hole of the forward bearing housing; a speed sensor for measuring the speed of rotation of the shaft; a generator housing attached to the single forward flange; and a generator within the generator housing, the generator converting rotational energy of the shaft into electrical energy.

In a further aspect of the present invention, a gas turbine engine comprises a compressor module having an external housing with a forward end and an aft end, an open mode inlet duct and a closed mode inlet duct in the external housing, a forward bearing housing conically extending from the forward end of the external housing and into the external housing, a bell mouth circumferentially disposed within the external housing, a forward flange on the forward end, and an aft flange on the aft end; a combustion section attached at the aft end of the external housing; a generator housing attached at the forward end of the external housing; and a generator within the generator housing.

In still a further aspect of the present invention, a gas turbine engine used as an auxiliary power unit for an aircraft comprises a compressor module having an external housing with a forward end and an aft end, an open mode inlet duct and a closed mode inlet duct in the external housing, a forward bearing housing conically extending from the forward end of the external housing into the external housing, a bell mouth circumferentially disposed within the external housing, a single forward flange on the forward end, and a single aft flange on the aft end; a compressor scroll attached at the aft end of the external housing; a generator housing attached at the forward end of the external housing; a generator within the generator housing; a shaft extending from the combustion section, through the compressor module and into the generator housing; a compressor wheel rotatably disposed at the aft end on the shaft; a compressor shroud/diffuser disposed circumferentially about the compressor wheel; a hole in an apex portion of the conically extending forward bearing housing, wherein the shaft extends from the compressor wheel through the hole; a forward bearing disposed within the forward bearing housing, the forward bearing providing axial and radial support of the shaft; and a speed sensor for measuring the speed of rotation of the shaft; wherein the bell mouth and the compressor wheel provide an air path for air to flow to the rotatable compressor wheel and to be discharged into a compressor discharge scroll at an increased pressure from a pressure at the inlet duct.

In yet a further aspect of the present invention, a method of providing auxiliary power with a gas turbine engine comprises 1) providing a compressor module having an external housing with a forward end and an aft end, an open mode inlet duct and a closed mode inlet duct in the external housing, a forward bearing housing conically extending from the forward end of the external housing into the external housing, and a bell mouth circumferentially disposed within the external housing; 2) attaching a generator housing at the forward end of the external housing; 3) providing a generator within the generator housing; 4) attaching a combustion section attached at the aft end of the external housing; 5) extending a shaft from a turbine in the combustion section, through the compressor module and into the generator housing; 6) rotatably disposing a compressor wheel at the aft end on the shaft; 7) circumferentially disposing a compressor shroud/diffuser about the compressor wheel; 8) rotating the shaft to provide mechanical rotational power to the generator; and 9) converting the mechanical rotational power to electrical power.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

Broadly, the present invention provides for a compressor of a gas engine, such as a gas turbine engine, having the number of components reduced, as described below, by at least one component and up to four components. Such a design allows for a reduction in weight. A reduced number of components allows the components to be arranged in close tolerance. In conventional compressor designs, the components may vary in material and, thus, vary in heat capacities. Such variation requires additional component tolerances because one material may thermally expand differently as compared to another component. Further, manufacturing variances between the components require additional component tolerances in order to account for these manufacturing variations.

More specifically, the present invention provides a compressor having three main parts, whereas prior designs typically employ seven main parts: an inner housing to hold the bearing requirements, an outer housing to carry the carcass load, an inlet plenum with a single inlet, a separate bell mouth, an impeller shroud, a diffuser and an impeller. As will be discussed in more detail below, the compressor of the present invention includes a forward bearing housing, a bell-mouth (heat shield), and an impeller shroud/diffuser. The forward bearing housing integrates the functions of the conventional inner housing, outer housing and inlet plenum. As is described in more detail below, this single part will carry engine carcass loads between the generator housing and the compressor discharge scroll. Such a design achieves the objectives of the present invention, including reduced weight, reduced cost, minimized tolerance build up, and improved aerodynamic performance by utilizing multiple component integration.

Figure 1:
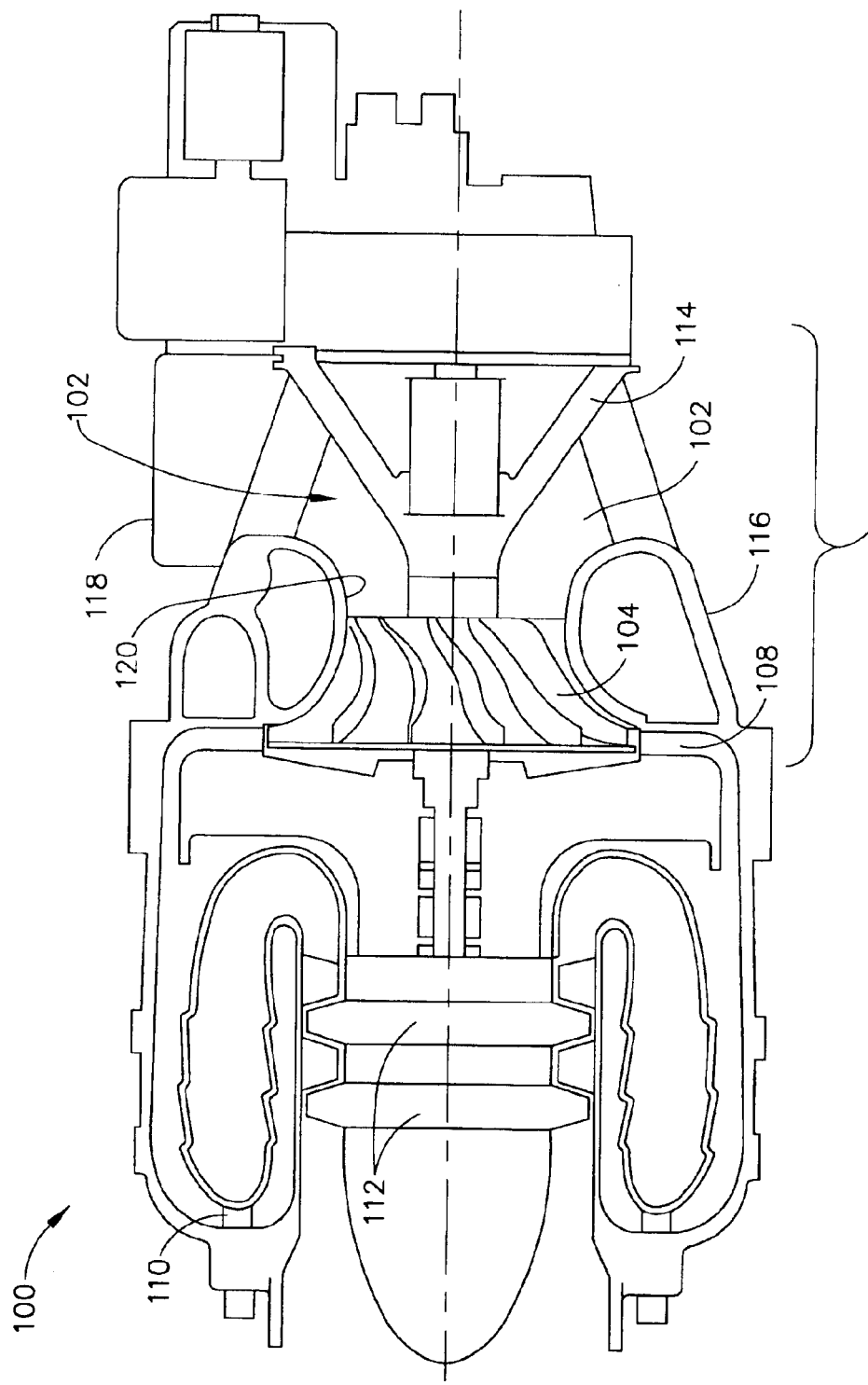
FIG. 1 is a partially cut-away cross-sectional view of a conventional gas turbine engine.
Figure 2:
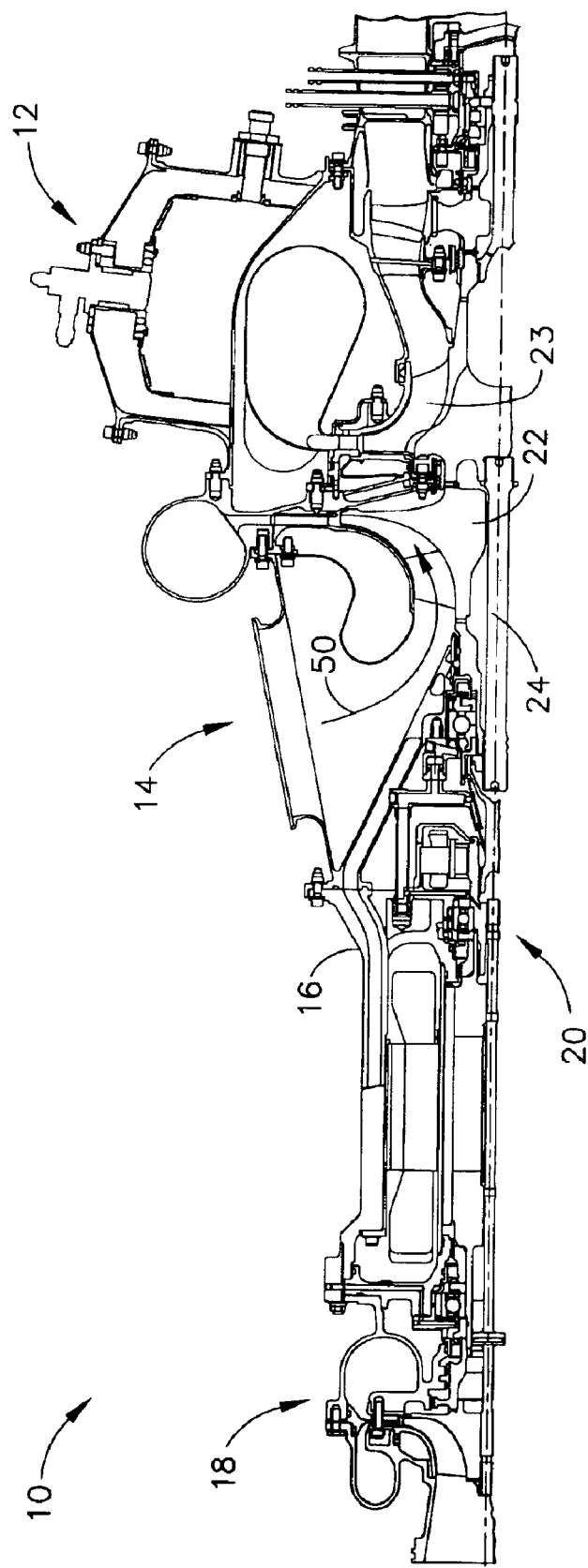
FIG. 2 is a schematic cross-sectional view of a high-performance gas turbine engine of the present invention.

Referring to FIG. 2, there is shown a cross-sectional view of a gas turbine engine 10 according to the present invention. Broadly, engine 10 may include a combustion module 12, a compressor module 14, a generator housing 16, and a cool turbine 18. Engine 10 can be especially useful when used as a typical auxiliary power unit (APU) in a high-performance jet aircraft. When the aircraft is on the ground, engine 10 may operate in an open-loop, fired mode. In such mode, combustion module 12 may provide hot combustion gases which, in a manner similar to the conventional gas turbine engine previously described, may drive a generator 20 and a compressor wheel 22. During aircraft flight, engine 10 may operate in a closed-loop mode, using main propulsion engine bleed air for power in such mode, bleed air from the main propulsion engine (not shown) can be routed to drive turbine wheel 23 which, in turn, can rotate a shaft 24 that drives generator 20.

Figure 3:
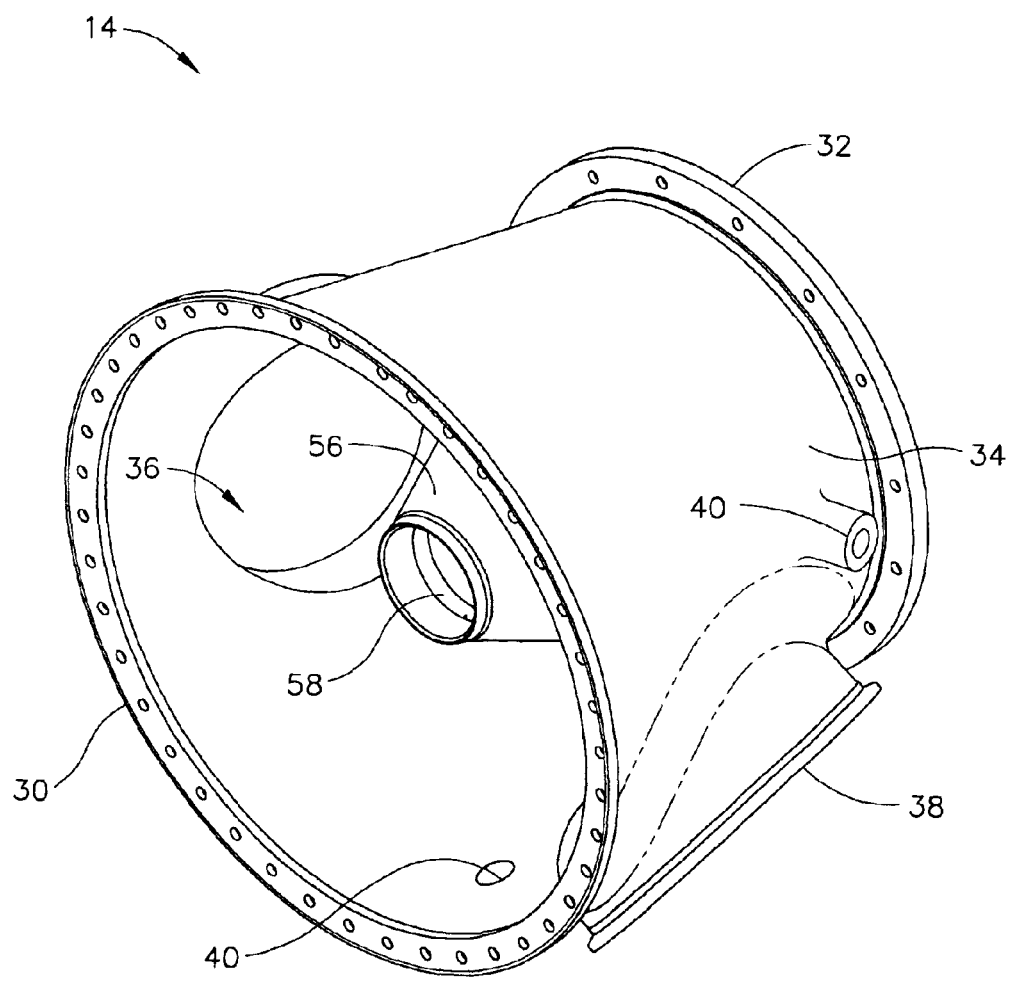
FIG. 3 is an isometric view of a compressor module according to the present invention.
Figure 4:
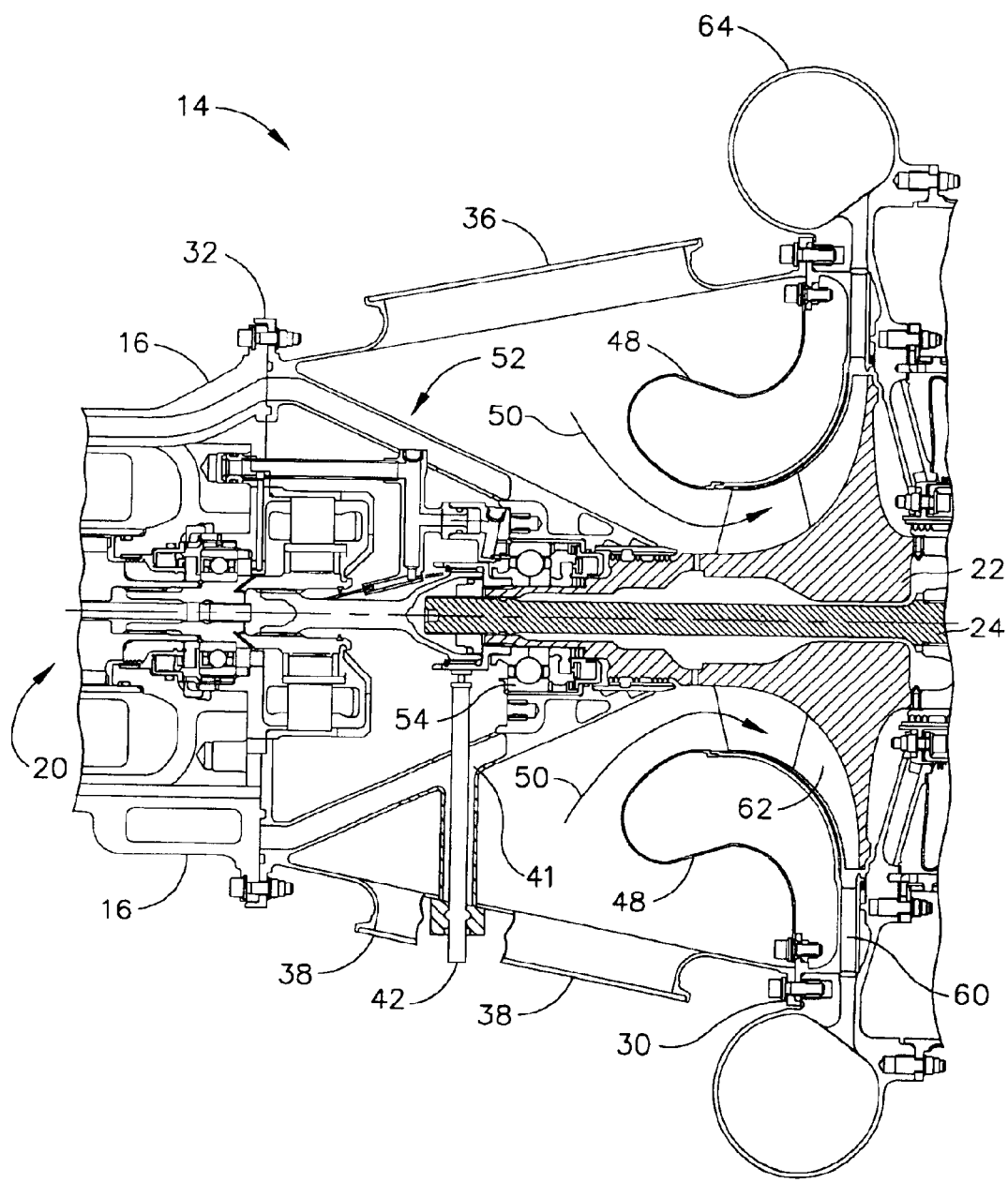
FIG. 4 is a cross-sectional view showing the compressor module of the present invention.

Referring to FIGS. 3 and 4, there are shown multiple views of compressor module 14. A single aft flange 30 may connect compressor module 14 to combustion module 12 (FIG. 2). A single forward flange 32 may connect compressor module 14 to generator housing 16.

Compressor module 14 can include an external housing 34 having an open mode inlet duct 36 for air inlet during operation of engine 10 in the open-loop mode as described above. A closed mode inlet duct 38 can be provided in external housing 34 for inlet air feed during operation of engine 10 in the closed-loop mode as described above. The inlet air feed during the closed-loop mode may be engine bleed air from the main propulsion engine (not shown). The outer surface of external housing 34 may provide mounting for various external control devices and ancillary installation hardware, such as a speed sensor 42, as described below.

A speed sensor insertion manifold 40 may also be formed as a cylinder through both wall of external housing 34 and forward bearing housing 52 to prevent oil leakage into the flow path and in external housing 34 for insertion of speed sensor 42 to measure the speed of rotation of a shaft 24. Preferably, during operation of the high-performance aircraft, engine 10 is powered by main propulsion engine bleed air.

An inlet bell mouth 48 may be disposed within external housing 34 of compressor module 14. Temperature differentials in compressor module 14 may result in different parts having different thermal expansion characteristics, thus requiring additional clearances and, therefore, resulting in a larger engine size. Bell mouth 48 is preferably formed circumferentially around compressor wheel 22.

Forward bearing housing 52 may be formed within compressor module 14. Forward bearing housing 52 may be formed in a conical shape with an apex 56 directed toward aft flange 40. Apex 56 may have an opening 58 through which shaft 24 may be inserted. A forward bearing 54 may be housed within forward bearing housing 52. Forward bearing 54 can provide axial and radial support where shaft 24 meets non-rotating components, such as generator 20 and compressor module 14. Forward bearing housing 52 can integrate the functions of the inner housing with multiple inlet ducts 36 and 38, outer housing and inlet plenum as found on conventional compressor modules as previously described. A second speed sensor manifold 41 can be formed in forward bearing housing 52, in line with speed sensor manifold 40, thereby permitting speed sensor 42 simultaneous insertion through both speed sensor manifold 40 and second speed sensor manifold 41.

Shaft 24 may terminate at generator 20. Generator 20 may be used as a typical APU or for starting larger engines. Generator 20 may employ a typical power turbine governing system (not shown) to regulate the speed of shaft 24 to drive loads requiring more consistent shaft speeds, such as AC generators.

A compressor shroud and/or diffuser 60 is provided downstream, as indicated by arrows 50, of compressor wheel 22.

The components of compressor module 14 may be made through typical manufacturing processes. For example, compressor shroud/diffuser 60 may be formed from a forged ring by machining and brazing. Forward bearing housing 52 may be made from investment casting. Bell mouth 48 may be made from sheet metal welded to a machined ring. The materials may be chosen from any metal suitable for the physical and mechanical stresses of compressor module 14. For example, the components may be made from titanium, steel, aluminum composites, or stainless steel. Preferably, the components are made of titanium.

Compressor wheel 22 can be rotated either via rotating shaft 24 or via combustion and turbine expansion of pressurized air entering compressor module 14 via closed-mode inlet duct 38. In either case, impeller blades 62 can be rotated, causing air to be pressurized as it moves along the path shown by arrows 50. Compressed air can then be allowed to exit into a compressor discharge scroll 64. This compressed air may be used to feed a combustor chamber, cool aircraft avionics system or to pressurize aircraft cabins.

In a method of providing auxiliary power with a gas turbine engine according to the present invention, it can be seen that compressor module 12 may be used to provide a source of auxiliary power. Generator 20 may be attached at forward flange 32 of external housing 34. Combustion module 12 may be attached at aft flange 30 of external housing 34. Shaft 24 may be extended from combustion module 12, through compressor module 14 and into generator 20. Compressor wheel 22 is rotatably disposed at the end of shaft 24, opposite combustion module 12. A compressor shroud and/or diffuser 60 may be circumferentially disposed about compressor wheel 22. Shaft 24 may be rotated by turbine wheel 23 in the combustion module 12 to provide mechanical rotational power to generator 20, which converts this mechanical rotational power to electrical power.

It should be understood, of course, that the foregoing relates to preferred embodiments of the invention and that modifications may be made without departing from the spirit and scope of the invention.

We claim:

1. A compressor module for a turbine engine comprising:
   an external housing having a forward end and an aft end;
   an open mode inlet duct and a closed mode inlet duct in said external housing;
   a forward bearing housing conically extending from said forward end of said external housing and into said external housing; and
   a bell mouth circumferentially disposed within said external housing.

2. The compressor module of claim 1, further comprising a compressor wheel rotatably disposed at said aft end on a shaft.

3. The compressor module of claim 2, wherein said bell mouth and said compressor wheel define an air path for air to move through said compressor module and into a compressor discharge scroll.

4. The compressor module of claim 2, further comprising a speed sensor for measuring the speed of rotation of said shaft.

5. The compressor module of claim 2, further comprising:
   a forward flange on said forward end; and
   an aft flange on said aft end.

6. The compressor module of claim 5, further comprising:
   a hole in an apex portion of said conically extending forward bearing housing, wherein said shaft extends from said compressor wheel and through said hole;
   a generator housing attached to said aft flange; and
   a generator within said generator housing, said generator converting rotational energy of said shaft into electrical energy.

7. The compressor module of claim 6, further comprising a forward bearing disposed within said forward bearing housing, said forward bearing providing axial and radial support of a shaft extending through said hole of said forward bearing housing.

8. The compressor module of claim 1, further comprising a generator that converts rotational energy of said shaft into electrical energy.

9. The compressor module of claim 1, wherein said compressor module is formed of titanium metal.

10. The compressor module of claim 1, wherein:
    said open mode inlet duct communicates with atmospheric air;
    said closed mode inlet duct communicates with engine bleed air of a main propulsion gas turbine engine; and
    one of said open mode inlet duct and said closed mode inlet duct is open and the other is closed during operation of said gas turbine engine.

11. A compressor module for a gas engine, comprising:
    an external housing having:
       a forward end and an aft end,
       an open mode inlet duct and a closed mode inlet duct in said external housing,
       a forward bearing housing conically extending from said forward end of said external housing into said external housing,
       a bell mouth circumferentially disposed within said external housing, a forward flange on said forward end, and
an aft flange on said aft end;
a compressor wheel rotatably disposed at said aft end on a shaft; and
a compressor shroud/diffuser disposed circumferentially about said compressor wheel;
wherein said bell mouth and said compressor wheel provide an air path for air to flow to said rotatable compressor wheel and to be discharged into a compressor discharge scroll at an increased pressure from a pressure at said inlet duct.

12. The compressor according to claim 11, further comprising:
a hole in an apex portion of said conically extending forward bearing housing, wherein said shaft extends from said compressor wheel and through said hole;
a forward bearing disposed within said forward bearing housing, said forward bearing providing axial and radial support of a shaft extending through said hole of said forward bearing housing;
a generator housing attached to said single aft flange; and
a generator within said generator housing, said generator converting rotational energy of said shaft into electrical energy.

13. A compressor module for a gas turbine engine of an aircraft, comprising:
an external housing having:
a forward end and an aft end,
an open mode inlet duct and a closed mode inlet duct in said external housing,
a forward bearing housing conically extending from said forward end of said external housing and into said external housing,
a bell mouth circumferentially disposed within said external housing,
a forward flange on said forward end, and
an aft flange on said aft end;
a compressor wheel rotatably disposed at said aft end on a shaft;
a compressor shroud/diffuser disposed circumferentially about said compressor wheel, wherein said bell mouth and said compressor wheel provide an air path for air to flow to said rotatable compressor wheel and to be discharged into a compressor discharge scroll at an increased pressure from a pressure at said inlet duct;
a hole in an apex portion of said conically extending forward bearing housing, wherein said shaft extends from said compressor wheel through said hole;
a forward bearing disposed within said forward bearing housing, said forward bearing providing axial and radial support of said shaft extending through said hole of said forward bearing housing;
a speed sensor for measuring the speed of rotation of said shaft;
a speed sensor boss to isolate potential oil leakage from the flow path;
a generator housing attached to said single aft flange; and
a generator within said generator housing, said generator converting rotational energy of said shaft into electrical energy.

14. A gas turbine engine comprising:
a compressor module having:
an external housing with a forward end and an aft end,
an open mode inlet duct and a closed mode inlet duct in said external housing,
a forward bearing housing conically extending from said forward end of said external housing and into said external housing,
a bell mouth circumferentially disposed within said external housing,
a forward flange on said forward end, and
an aft flange on said aft end;
a combustion section attached at said aft end of said external housing;
a generator housing attached at said forward end of said external housing; and
a generator within said generator housing.

15. The gas turbine engine according to claim 14, further comprising:
a shaft extending from said combustion section, through said compressor module, and into said generator housing;
a compressor wheel rotatably disposed at said aft end on said shaft;
a compressor shroud/diffuser disposed circumferentially about said compressor wheel;
a hole in an apex portion of said conically extending forward bearing housing, wherein said shaft extends from said compressor wheel through said hole;
wherein said bell mouth and said compressor wheel provide an air path for air to flow to said rotatable compressor wheel and to be discharged into a compressor discharge scroll at an increased pressure from a pressure at said inlet duct.

16. The gas turbine engine according to claim 15, further comprising:
a forward bearing disposed within said forward bearing housing, said forward bearing providing axial and radial support of a shaft extending through said hole of said forward bearing housing; and
a speed sensor for measuring the speed of rotation of said shaft.

17. The gas turbine engine according to claim 15, wherein said gas turbine engine is used as an auxiliary power unit.

18. The gas turbine engine according to claim 17, wherein said auxiliary power unit is mounted in an aircraft having at least one propulsion engine.

19. The gas turbine engine according to claim 18, wherein when said aircraft is on the ground: said shaft is rotated by a turbine in said combustion section, said shaft rotates said compressor wheel and provides shaft rotational motion for said generator; said open mode inlet duct communicates with atmospheric air; and said closed mode inlet duct is closed.

20. The gas turbine engine according to claim 18, wherein when said aircraft is operated in flight: said compressor wheel is rotated by combustion and turbine expansion of the pressurized bleed air delivered from said propulsion engine into said closed mode inlet duct, to provide shaft rotational motion for said generator.

21. A gas turbine engine used as an auxiliary power unit for an aircraft, comprising:
a compressor module having:
an external housing with a forward end and an aft end,
an open mode inlet duct and a closed mode inlet duct in said external housing,
a forward bearing housing conically extending from said forward end of said external housing and into said external housing,
a bell mouth circumferentially disposed within said external housing, a forward flange on said forward end, and
an aft flange on said aft end;

a combustion section attached at said aft end of said external housing;

a generator housing attached at said forward end of said external housing;

a generator within said generator housing;

a shaft extending from said combustion section, through said compressor module, and into said generator housing;

a compressor wheel rotatably disposed at said aft end on said shaft;

a hole in an apex portion of said conically extending forward bearing housing, wherein said shaft extends from said compressor wheel through said hole;

a forward bearing disposed within said forward bearing housing, said forward bearing providing axial and radial support of said shaft; and a speed sensor for measuring the speed of rotation of said shaft;

wherein said bell mouth and said compressor wheel provide an air path for air to flow to said rotatable compressor wheel and to be discharged into a compressor discharge scroll at an increased pressure from a pressure at said inlet duct.

22. The gas turbine engine according to claim 21, wherein: when said aircraft is on the ground: said shaft is rotated by a turbine in said combustion section, said shaft rotates said compressor wheel and provides shaft rotational motion for said generator, said open mode inlet duct communicates with atmospheric air, and said closed mode inlet duct is closed; and when said aircraft is operated in flight: said compressor wheel is rotated by combustion and turbine expansion of the pressurized bleed air delivered from said propulsion engine into said closed mode inlet duct, to provide shaft rotational motion for said generator.

23. A method of providing auxiliary power with a gas turbine engine:

providing a compressor module having an external housing with a forward end and an aft end, an open mode inlet duct and a closed mode inlet duct in said external housing, a forward bearing housing conically extending from said forward end of said external housing into said external housing, and a bell mouth circumferentially disposed within said external housing;

attaching a generator housing at said forward end of said external housing;

providing a generator within said generator housing;

attaching a combustion section attached at said aft end of said external housing;

extending a shaft from said combustion section, through said compressor module and into said generator housing;

rotatably disposing a compressor wheel at said aft end on said shaft;

rotating said shaft to provide mechanical rotational power to said generator; and converting said mechanical rotational power to electrical power.

24. The method according to claim 23, wherein said shaft is rotated by a turbine in said combustion section, said shaft rotates said compressor wheel and provides shaft rotational motion for said generator, said open mode inlet duct communicates with atmospheric air, and said closed mode inlet duct is closed.

25. The method according to claim 23, further comprising delivering pressurized air into said closed mode inlet duct, combustion and turbine expansion of which rotates said compressor wheel, to provide said mechanical rotational power.

26. The method according to claim 25, further comprising:

measuring rotational speed of said shaft; and adjusting a volume of said pressurized air to adjust said rotational speed to a predetermined angular velocity.

27. The method according to claim 26, wherein said pressurized air is provided from bleed air of a gas turbine engine.

* * * * *